US006870946B1

(12) United States Patent
Teng et al.

(10) Patent No.: US 6,870,946 B1
(45) Date of Patent: Mar. 22, 2005

(54) COMPACT OPTICAL FINGERPRINT CAPTURING AND RECOGNITION SYSTEM

(75) Inventors: Harry H. Teng, Stanford, CA (US); Sung-Chan Jo, Seoul (KR)

(73) Assignee: SecuGen Corporation, Santa Clara, CA (US)

(*) Notice: Subject to any disclaimer, the term of this patent is extended or adjusted under 35 U.S.C. 154(b) by 0 days.

(21) Appl. No.: 09/364,499

(22) Filed: Jul. 30, 1999

Related U.S. Application Data

(60) Provisional application No. 60/095,525, filed on Aug. 6, 1998.

(51) Int. Cl.$^7$ .................................................. G06K 9/00
(52) U.S. Cl. ........................ 382/124; 382/314; 356/458
(58) Field of Search ................................. 382/115, 116, 382/127, 128, 314, 124; 345/164; 356/71, 458, 457; 340/5.82, 5.83; 250/227.11, 227.12

(56) References Cited

U.S. PATENT DOCUMENTS

| | | | |
|---|---|---|---|
| 3,383,657 A | 5/1968 | Claassen et al. | 340/553 |
| 3,527,535 A | 9/1970 | Monroe | 356/398 |
| 3,771,124 A | 11/1973 | McMahon | 382/210 |
| 3,771,129 A | 11/1973 | McMahon | 382/127 |
| 3,864,042 A | 2/1975 | Leventhal | 356/398 |

(List continued on next page.)

FOREIGN PATENT DOCUMENTS

| | | |
|---|---|---|
| CA | 1 286 032 | 7/1991 |
| CA | 1286032 | 9/1991 |
| DE | 19509751 | 9/1996 |
| DE | 195090751 | 9/1996 |
| EP | 0 045 915 | 2/1982 |

(List continued on next page.)

OTHER PUBLICATIONS

Igaki, S. et al. (Jan. 1990). "Holographic Fingerprint Sensor," *FUJITSU–Sci. Tech. J.* 25(4):287–296.

AuthenTec, Inc. (unknown). Personal Security for the Real World. "A Comparison of Capacitive and Electric–Field Based Human Fingerprint Readers: The Basic Transducer Physics," located at http://www.authentec.com/.3 pages.

Isobe, Y, et al. (2001). Development of Personal Authentication System Using Fingerprint with.

Digital Signature Technologies, *Proceedings of the 34th Hawaii International Conference on System Sciences, IEEE* pp. 1–9.

Kim, J–H. et al. (2000). "Fingerprint Scanner Using a–SI: H TFT–Array," *SID* Digest pp. 353–355.

Pettersson, M. et al. (2001). "Ensuring Integrity with Fingerprint Verification," *Precise Biometrics White Paper AB.* 5 pages.

Sanchez–Reillo, R.et al.. (2000). "Access Control Systems with Hand Geometry Verification," *IEEE AES Systems Magazine* pp. 45–48.

Ruiz–Mezcua, B.et al. (1999). "Biometrics Verification in a Real Environment," *IEEE* pp. 243–246.

Verlinde, P et al. (2000). "Multi–Modal Identity Verification Using Expert Fusion," *Information Fusion* 1:17–33.

*Primary Examiner*—Bhavesh M. Mehta
*Assistant Examiner*—Sheela Chawan
(74) *Attorney, Agent, or Firm*—Morrison & Foerster LLP

(57) ABSTRACT

An apparatus and method for acquiring an image of a patterned object such as a fingerprint including a light refracting device, a focusing lens, a light source, and a biometric circuit for detecting the presence of a patterned object such as a fingerprint at the light refracting device. Incident light from the light source is projected through a light receiving surface of the light refracting device and is directly reflected off an imaging surface. The resulting image is projected through the focusing lens. The focusing lens has a diameter which is larger than the projection of the patterned object through the light refracting device.

9 Claims, 6 Drawing Sheets

U.S. PATENT DOCUMENTS

| | | | |
|---|---|---|---|
| 3,865,488 A | 2/1975 | Del Rio | 356/71 |
| 3,873,970 A | 3/1975 | McMahon et al. | 382/127 |
| 3,882,462 A | 5/1975 | McMahon | 382/127 |
| 3,891,968 A | 6/1975 | McMahon | 382/124 |
| 3,947,128 A | 3/1976 | Weinberger et al. | 356/71 |
| 3,968,476 A | 7/1976 | McMahon | 382/127 |
| 3,975,711 A | 8/1976 | McMahon | 250/350 |
| 3,982,836 A | 9/1976 | Green et al. | 356/370 |
| 4,003,656 A | 1/1977 | Leventhal | 356/71 |
| 4,025,898 A | 5/1977 | Shaw | 382/124 |
| 4,120,585 A | 10/1978 | DePalma et al. | 359/831 |
| 4,135,147 A | 1/1979 | Riganati et al. | 382/209 |
| 4,138,058 A | 2/1979 | Atalla | 235/380 |
| 4,140,272 A | 2/1979 | Atalla | 235/380 |
| 4,210,899 A | 7/1980 | Swonger et al. | 382/125 |
| 4,246,568 A | 1/1981 | Peterson | 382/126 |
| 4,253,086 A | 2/1981 | Szwarcbier | 382/126 |
| 4,258,994 A | 3/1981 | Task | 396/14 |
| 4,322,163 A | 3/1982 | Schiller | 356/71 |
| 4,336,998 A | 6/1982 | Ruell | 356/71 |
| 4,338,025 A | 7/1982 | Engel | 356/71 |
| 4,340,300 A | 7/1982 | Ruell | 356/71 |
| 4,353,056 A | 10/1982 | Tsikos | 382/124 |
| 4,358,677 A * | 11/1982 | Ruell et al. | 340/5.53 |
| 4,385,831 A | 5/1983 | Ruell | 356/71 |
| 4,394,773 A | 7/1983 | Ruell | 382/124 |
| 4,414,684 A | 11/1983 | Blonder | |
| 4,428,670 A | 1/1984 | Ruell et al. | 356/71 |
| 4,429,413 A | 1/1984 | Edwards | 382/124 |
| 4,455,083 A | 6/1984 | Elmes | 356/71 |
| 4,467,545 A | 8/1984 | Shaw, Jr. | 42/70.01 |
| 4,486,180 A | 12/1984 | Riley | 434/65 |
| 4,537,484 A | 8/1985 | Fowler et al. | 356/71 |
| 4,544,267 A | 10/1985 | Schiller | 356/71 |
| 4,553,837 A | 11/1985 | Marcus | 356/71 |
| 4,569,080 A | 2/1986 | Schiller | 382/126 |
| 4,577,345 A | 3/1986 | Abramov | 382/124 |
| 4,582,985 A | 4/1986 | Löfberg | 382/126 |
| 4,636,622 A | 1/1987 | Clark | 382/124 |
| 4,668,995 A | 5/1987 | Chen et al. | 382/272 |
| 4,681,435 A | 7/1987 | Kubota et al. | 396/15 |
| 4,681,438 A | 7/1987 | Kaneko | 356/71 |
| 4,684,802 A | 8/1987 | Hakenewerth et al. | 250/235 |
| 4,701,959 A | 10/1987 | Asai et al. | 382/126 |
| 4,728,186 A | 3/1988 | Eguchi et al. | 356/71 |
| 4,729,128 A | 3/1988 | Grimes et al. | 382/116 |
| 4,745,268 A | 5/1988 | Drexler | 235/487 |
| 4,768,021 A | 8/1988 | Ferraro | 340/568.1 |
| 4,783,167 A | 11/1988 | Schiller et al. | 356/71 |
| 4,783,823 A | 11/1988 | Tasaki et al. | 382/116 |
| 4,784,484 A | 11/1988 | Jensen | 356/71 |
| 4,785,171 A | 11/1988 | Dowling, Jr. et al. | 250/227.28 |
| 4,787,742 A | 11/1988 | Schiller et al. | 356/71 |
| 4,792,226 A | 12/1988 | Fishbine et al. | 356/71 |
| 4,832,485 A | 5/1989 | Bowles | 356/71 |
| 4,835,376 A | 5/1989 | Drexler | 235/488 |
| 4,872,203 A | 10/1989 | Asai et al. | 382/124 |
| 4,876,725 A | 10/1989 | Tomko | 382/126 |
| 4,889,983 A | 12/1989 | Numano et al. | 257/53 |
| 4,905,293 A | 2/1990 | Asai et al. | 382/126 |
| 4,924,085 A | 5/1990 | Kato et al. | 256/227.28 |
| 4,925,300 A | 5/1990 | Rachlin | 356/71 |
| 4,932,776 A | 6/1990 | Dowling, Jr. et al. | 356/71 |
| 4,936,680 A | 6/1990 | Henkes et al. | 356/71 |
| 4,946,276 A | 8/1990 | Chilcott | 356/71 |
| 4,977,601 A | 12/1990 | Bicz | 382/124 |
| 4,979,007 A | 12/1990 | Ogawa et al. | 257/436 |
| 4,983,415 A | 1/1991 | Arndt et al. | 427/1 |
| 4,995,086 A | 2/1991 | Lilley et al. | 382/124 |
| 5,050,220 A | 9/1991 | Marsh et al. | 382/124 |
| 5,051,576 A | 9/1991 | Schiller | 250/227.11 |
| 5,053,608 A | 10/1991 | Senanayake | 235/380 |
| 5,067,162 A | 11/1991 | Driscoll, Jr. et al. | 382/126 |
| 5,077,803 A * | 12/1991 | Kato et al. | 382/124 |
| 5,095,194 A | 3/1992 | Barbanell | 235/379 |
| 5,096,290 A | 3/1992 | Ohta | 356/71 |
| 5,103,486 A | 4/1992 | Grippi | 382/116 |
| 5,109,427 A | 4/1992 | Yang | 382/127 |
| 5,138,468 A | 8/1992 | Barbanell | 359/2 |
| 5,144,680 A | 9/1992 | Kobayashi et al. | 382/124 |
| 5,146,102 A | 9/1992 | Higuchi et al. | 250/556 |
| 5,162,644 A | 11/1992 | Nagata et al. | 250/208.1 |
| 5,175,593 A | 12/1992 | Kumagai et al. | 356/71 |
| 5,177,353 A | 1/1993 | Schiller | 250/227.11 |
| 5,177,435 A | 1/1993 | Kiyokawa et al. | 324/755 |
| 5,177,802 A | 1/1993 | Fujimoto et al. | 382/124 |
| 5,187,748 A | 2/1993 | Lee | 382/127 |
| 5,189,482 A | 2/1993 | Yang | 356/73 |
| 5,193,855 A | 3/1993 | Shamos | 283/117 |
| 5,210,588 A | 5/1993 | Lee | 382/124 |
| 5,214,699 A | 5/1993 | Monroe et al. | 713/186 |
| 5,222,152 A | 6/1993 | Fishbine et al. | 382/127 |
| 5,222,153 A | 6/1993 | Beiswenger | 356/71 |
| 5,224,173 A | 6/1993 | Kuhns et al. | 382/116 |
| 5,224,174 A | 6/1993 | Schneider et al. | 382/124 |
| 5,229,764 A | 7/1993 | Matchett et al. | 340/552 |
| 5,230,025 A | 7/1993 | Fishbine et al. | 382/127 |
| 5,233,404 A | 8/1993 | Lougheed et al. | 382/127 |
| 5,239,590 A | 8/1993 | Yamamoto | 382/125 |
| 5,241,606 A | 8/1993 | Horie | 382/126 |
| 5,259,025 A | 11/1993 | Monroe et al. | 705/75 |
| 5,261,008 A | 11/1993 | Yamamoto | 382/127 |
| 5,268,963 A | 12/1993 | Monroe et al. | 713/186 |
| 5,280,527 A | 1/1994 | Gullman et al. | 713/184 |
| 5,309,288 A | 5/1994 | Kahre | 359/831 |
| 5,325,442 A | 6/1994 | Knapp | 382/124 |
| 5,337,369 A | 8/1994 | Shibuya | 382/125 |
| 5,343,529 A | 8/1994 | Goldfine et al. | 705/75 |
| 5,349,174 A | 9/1994 | Van Berkel et al. | 250/208.1 |
| 5,363,453 A | 11/1994 | Gagne et al. | 382/125 |
| 5,373,181 A | 12/1994 | Scheiter et al. | 257/415 |
| 5,386,104 A | 1/1995 | Sime | 235/379 |
| 5,400,662 A | 3/1995 | Tamori | 73/862.046 |
| 5,416,573 A | 5/1995 | Sartor, Jr. | 356/71 |
| 5,420,936 A | 5/1995 | Fitzpatrick et al. | 382/124 |
| 5,420,937 A | 5/1995 | Davis | 382/125 |
| 5,426,708 A | 6/1995 | Hamada et al. | 382/125 |
| 5,446,290 A | 8/1995 | Fujieda et al. | 250/556 |
| 5,448,649 A | 9/1995 | Chen et al. | 382/126 |
| 5,448,659 A | 9/1995 | Tsutsui et al. | 385/14 |
| 5,456,256 A | 10/1995 | Schneider et al. | 600/445 |
| 5,465,303 A | 11/1995 | Levison et al. | 382/124 |
| 5,467,403 A | 11/1995 | Fishbine et al. | 382/116 |
| 5,480,810 A | 1/1996 | Wei et al. | 438/59 |
| 5,485,312 A | 1/1996 | Horner et al. | 438/59 |
| 5,493,621 A | 2/1996 | Matsumura | 359/561 |
| 5,503,029 A | 4/1996 | Tamori | 382/125 |
| 5,509,083 A | 4/1996 | Abtahi et al. | 73/862.046 |
| 5,513,272 A | 4/1996 | Bogosian, Jr. | 382/124 |
| 5,515,298 A | 5/1996 | Bicz | 702/167 |
| 5,515,738 A | 5/1996 | Tamori | 93/862.46 |
| 5,524,161 A | 6/1996 | Omori et al. | 382/125 |
| 5,526,701 A | 6/1996 | Tamori | 73/862.046 |
| 5,541,994 A | 7/1996 | Tomko et al. | 380/30 |
| 5,546,471 A | 8/1996 | Merjanian | 382/124 |
| 5,548,394 A | 8/1996 | Giles et al. | 356/71 |
| 5,559,504 A | 9/1996 | Itsumi et al. | 340/553 |
| 5,563,345 A | 10/1996 | Kersten et al. | 73/602 |
| 5,587,533 A | 12/1996 | Schneider et al. | 73/614 |
| 5,596,454 A | 1/1997 | Hebert | 359/726 |
| 5,598,474 A | 1/1997 | Johnson | 713/186 |

| | | | |
|---|---|---|---|
| 5,603,179 A | 2/1997 | Adams | 42/70.08 |
| 5,619,586 A | 4/1997 | Sibbald | 382/127 |
| 5,621,516 A | 4/1997 | Shinzaki et al. | 356/71 |
| 5,623,552 A | 4/1997 | Lane | 382/124 |
| 5,623,553 A | 4/1997 | Sekiya | 356/71 |
| 5,625,448 A | 4/1997 | Ranalli et al. | 356/71 |
| 5,629,764 A | 5/1997 | Bahuguna et al. | 356/71 |
| 5,635,723 A | 6/1997 | Fujieda et al. | 382/127 |
| 5,644,645 A | 7/1997 | Osuga | 382/124 |
| 5,648,648 A | 7/1997 | Chou et al. | 235/382 |
| 5,650,842 A | 7/1997 | Maase et al. | 356/71 |
| 5,680,205 A | 10/1997 | Borza | 382/116 |
| 5,680,460 A | 10/1997 | Tomko et al. | 713/186 |
| 5,686,765 A | 11/1997 | Washington | 307/10.5 |
| 5,689,576 A | 11/1997 | Schneider et al. | 382/124 |
| 5,701,770 A | 12/1997 | Cook et al. | 70/63 |
| 5,708,497 A | 1/1998 | Fujieda | 356/71 |
| 5,712,912 A | 1/1998 | Tomka et al. | 713/186 |
| 5,721,583 A | 2/1998 | Harada et al. | 725/24 |
| 5,729,334 A | 3/1998 | Van Ruyven | 356/71 |
| 5,732,148 A | 3/1998 | Keagy et al. | 382/124 |
| 5,736,734 A | 4/1998 | Marcus et al. | 250/225 |
| 5,737,071 A | 4/1998 | Arndt | 382/124 |
| 5,737,420 A | 4/1998 | Tomko et al. | 380/285 |
| 5,737,439 A | 4/1998 | Lapsley et al. | 382/115 |
| 5,740,276 A | 4/1998 | Tomko et al. | 382/210 |
| 5,745,046 A | 4/1998 | Itsumi et al. | 382/115 |
| 5,748,765 A | 5/1998 | Takhar | 340/5.83 |
| 5,748,766 A | 5/1998 | Maase et al. | 382/124 |
| 5,757,278 A | 5/1998 | Itsumi | 382/124 |
| 5,761,330 A | 6/1998 | Stoianov et al. | 340/5.83 |
| 5,764,347 A | 6/1998 | Podmaniczky et al. | 382/127 |
| 5,778,089 A | 7/1998 | Borza | 356/71 |
| 5,781,651 A | 7/1998 | Hsiao et al. | 382/124 |
| 5,790,668 A | 8/1998 | Tomko | 713/186 |
| 5,796,857 A | 8/1998 | Hara | 382/124 |
| 5,796,858 A | 8/1998 | Zhou et al. | 382/127 |
| 5,808,729 A | 9/1998 | Sugawara et al. | 356/71 |
| 5,812,252 A | 9/1998 | Bowker et al. | 356/71 |
| 5,815,252 A | 9/1998 | Price-Francis | 382/211 |
| 5,815,598 A | 9/1998 | Hara et al. | 382/126 |
| 5,818,956 A | 10/1998 | Tuli | 235/380 |
| 5,825,005 A | 10/1998 | Behnke | 356/71 |
| 5,825,474 A | 10/1998 | Maase | 382/124 |
| 5,828,773 A | 10/1998 | Setlak et al. | 380/30 |
| 5,832,091 A | 11/1998 | Tomko et al. | 380/30 |
| 5,838,206 A | 11/1998 | Busca et al. | 331/3 |
| 5,838,306 A | 11/1998 | O'Connor et al. | 345/163 |
| 5,841,907 A | 11/1998 | Javidi et al. | 382/210 |
| 5,844,287 A | 12/1998 | Hassan et al. | 257/419 |
| 5,847,876 A | 12/1998 | Ferrante et al. | 359/581 |
| 5,848,231 A * | 12/1998 | Teitelbaum et al. | 713/200 |
| 5,852,670 A | 12/1998 | Setlak et al. | 382/126 |
| 5,859,420 A * | 1/1999 | Borza | 250/208.1 |
| 5,862,248 A | 1/1999 | Salatino et al. | 382/124 |
| 5,867,802 A | 2/1999 | Borza | 340/5.53 |
| 5,869,822 A | 2/1999 | Meadows, II et al. | 356/71 |
| 5,875,025 A | 2/1999 | Toyoda et al. | 356/71 |
| 5,879,454 A | 3/1999 | Peng | 118/31.5 |
| 5,892,599 A | 4/1999 | Bahuguna | 359/15 |
| 5,900,993 A * | 5/1999 | Betensky | 356/71 |
| 5,903,225 A | 5/1999 | Schmitt et al. | 340/5.25 |
| 5,907,627 A | 5/1999 | Borza | 382/124 |
| 5,920,384 A | 7/1999 | Borza | 356/71 |
| 5,920,640 A | 7/1999 | Salatino et al. | 382/124 |
| 5,920,642 A | 7/1999 | Merjanian | 382/126 |
| 5,926,261 A | 7/1999 | Hoshino | 356/71 |
| 5,937,557 A | 8/1999 | Bowker et al. | 42/70.01 |
| 5,938,706 A | 8/1999 | Feldman | 701/32 |
| 5,940,525 A | 8/1999 | Itsumi | 701/32 |
| 5,940,526 A | 8/1999 | Setlak et al. | 382/124 |
| 5,942,761 A | 8/1999 | Tuli | 250/556 |
| 5,952,588 A | 9/1999 | Young | 73/862.626 |
| 5,953,441 A | 9/1999 | Setlak | 360/5.83 |
| 5,953,442 A | 9/1999 | Dydyk et al. | 382/125 |
| 5,956,415 A | 9/1999 | McCalley et al. | 382/124 |
| 5,963,656 A | 10/1999 | Boll et al. | 382/124 |
| 5,963,657 A | 10/1999 | Bowker et al. | 382/127 |
| 5,963,679 A | 10/1999 | Setlak | 382/312 |
| 5,970,405 A | 10/1999 | Kaplan et al. | 455/414 |
| 5,974,162 A | 10/1999 | Metz et al. | 382/124 |
| 5,978,495 A | 11/1999 | Thomopoulus et al. | 382/124 |
| 5,978,496 A | 11/1999 | Harkin | 382/124 |
| 5,982,894 A | 11/1999 | McCalley et al. | 360/5.21 |
| 5,986,746 A | 11/1999 | Metz et al. | 356/71 |
| 5,991,145 A | 11/1999 | Lagrotta et al. | 361/212 |
| 5,991,431 A * | 11/1999 | Borza et al. | 382/127 |
| 5,991,467 A | 11/1999 | Kamiko | 361/212 |
| 5,995,630 A | 11/1999 | Borza | 382/312 |
| 6,002,499 A | 12/1999 | Corboline et al. | 380/54 |
| 6,002,770 A | 12/1999 | Tomko et al. | 359/2 |
| 6,005,962 A | 12/1999 | Hirota et al. | 380/44 |
| 6,006,328 A | 12/1999 | Drake | 382/124 |
| 6,011,860 A * | 1/2000 | Fujieda et al. | 382/126 |
| 6,044,128 A | 3/2000 | Tanaka et al. | 713/200 |
| 6,115,483 A | 9/2000 | Suga | 378/98.8 |
| 6,115,484 A | 9/2000 | Bowker et al. | 382/124 |
| 6,122,394 A | 9/2000 | Neukermans et al. | 382/127 |
| 6,127,674 A | 10/2000 | Shinzaki et al. | 382/124 |
| 6,150,665 A | 11/2000 | Suga | 250/227.28 |
| 6,154,285 A | 11/2000 | Teng et al. | 356/445 |
| 6,175,641 B1 | 1/2001 | Kallo et al. | 356/445 |
| 6,185,319 B1 | 2/2001 | Fujiwara | 382/124 |
| 6,239,468 B1 | 5/2001 | Chang et al. | 357/347 |
| 6,300,977 B1 | 10/2001 | Waechter et al. | 348/300 |
| 6,324,020 B1 | 11/2001 | Teng et al. | 359/726 |
| 6,327,376 B1 | 12/2001 | Harkin | 382/124 |
| 6,381,347 B1 | 4/2002 | Teng et al. | 382/127 |
| 6,401,551 B1 | 6/2002 | Kawahara et al. | 73/862.337 |
| 6,462,563 B1 | 10/2002 | Kawahara et al. | 324/690 |
| 6,463,166 B1 | 10/2002 | Fujiwara | 382/127 |
| 6,501,529 B1 | 12/2002 | Kurihara et al. | 349/160 |
| 6,552,764 B2 | 4/2003 | Fujioka et al. | 349/106 |
| 2002/0000915 A1 | 1/2002 | Lee et al. | |
| 2002/0110266 A1 | 8/2002 | Teng et al. | 382/127 |
| 2003/0053228 A1 | 3/2003 | Lee et al. | 359/866 |

FOREIGN PATENT DOCUMENTS

| | | |
|---|---|---|
| EP | 0 308 162 | 3/1989 |
| EP | 0 308 162 A3 | 3/1989 |
| EP | 0 308 162 A2 | 3/1989 |
| EP | 0 617 919 | 10/1994 |
| EP | 0 617 919 A3 | 10/1994 |
| EP | 0 617 919 A2 | 10/1994 |
| EP | 0 640 933 | 3/1995 |
| EP | 0 847 024 A3 | 6/1998 |
| EP | 0 847 024 | 6/1998 |
| EP | 0 847 024 A2 | 6/1998 |
| EP | 0 867 828 | 9/1998 |
| EP | 0 867 828 A3 | 9/1998 |
| EP | 0 867 828 A2 | 9/1998 |
| EP | 0 867 829 | 9/1998 |
| EP | 0 867 829 A2 | 9/1998 |
| EP | 0 867 829 A3 | 9/1998 |
| JP | 55-013446 | 1/1980 |
| JP | 58-076705 | 5/1983 |
| JP | 58-144280 | 8/1983 |
| JP | 58-201178 | 11/1983 |
| JP | 59-053975 | 3/1984 |
| JP | 59-139481 | 8/1984 |
| JP | 59-142675 | 8/1984 |
| JP | 59-204019 | 11/1984 |

| | | | | | | |
|---|---|---|---|---|---|---|
| JP | 60-050406 | 3/1985 | | JP | 01-037934 | 2/1989 |
| JP | 07-220041 | 8/1985 | | JP | 01-046172 | 2/1989 |
| JP | 61-043380 | 3/1986 | | JP | 01-058069 | 3/1989 |
| JP | 61-045371 | 3/1986 | | JP | 01-068894 | 3/1989 |
| JP | 61-059574 | 3/1986 | | JP | 01-076376 | 3/1989 |
| JP | 59-103175 | 6/1986 | | JP | 01-094418 | 4/1989 |
| JP | 61-145686 | 7/1986 | | JP | 01-119881 | 5/1989 |
| JP | 61-151788 | 7/1986 | | JP | 01-119882 | 5/1989 |
| JP | 61-153779 | 7/1986 | | JP | 01-134687 | 5/1989 |
| JP | 361145686 A | 7/1986 | | JP | 01-180685 | 7/1989 |
| JP | 61-175866 | 8/1986 | | JP | 01-180686 | 7/1989 |
| JP | 61-175868 | 8/1986 | | JP | 01-205392 | 8/1989 |
| JP | 61-198211 | 9/1986 | | JP | 01-205393 | 8/1989 |
| JP | 61-201380 | 9/1986 | | JP | 01-223576 | 9/1989 |
| JP | 61-221883 | 10/1986 | | JP | 01-254827 | 10/1989 |
| JP | 61-240383 | 10/1986 | | JP | 01-262838 | 10/1989 |
| JP | 361221883 A | 10/1986 | | JP | 01-287786 | 11/1989 |
| JP | 61-292786 | 12/1986 | | JP | 01-307886 | 12/1989 |
| JP | 62-020081 | 1/1987 | | JP | 01-314383 | 12/1989 |
| JP | 62-042285 | 2/1987 | | JP | 02-001242 | 1/1990 |
| JP | 62-063381 | 3/1987 | | JP | 02-050782 | 2/1990 |
| JP | 62-072081 | 4/1987 | | JP | 02-126381 | 5/1990 |
| JP | 62-074171 | 4/1987 | | JP | 02-133892 | 5/1990 |
| JP | 62-074172 | 4/1987 | | JP | 402133892 A | 5/1990 |
| JP | 62-074175 | 4/1987 | | JP | 02-146691 | 6/1990 |
| JP | 62-074176 | 4/1987 | | JP | 02-149253 | 6/1990 |
| JP | 62-074177 | 4/1987 | | JP | 02-161931 | 6/1990 |
| JP | 62-079488 | 4/1987 | | JP | 02-164340 | 6/1990 |
| JP | 62-090780 | 4/1987 | | JP | 02-167138 | 6/1990 |
| JP | 362074177 A | 4/1987 | | JP | 02-176894 | 7/1990 |
| JP | 62-121587 | 6/1987 | | JP | 02-176984 | 7/1990 |
| JP | 62-121588 | 6/1987 | | JP | 02-188888 | 7/1990 |
| JP | 62-123580 | 6/1987 | | JP | 402188888 A | 7/1990 |
| JP | 62-154075 | 7/1987 | | JP | 02-194485 | 8/1990 |
| JP | 62-191816 | 8/1987 | | JP | 02-226493 | 9/1990 |
| JP | 62-206687 | 9/1987 | | JP | 02-270087 | 11/1990 |
| JP | 62-206688 | 9/1987 | | JP | 02-270088 | 11/1990 |
| JP | 62-206689 | 9/1987 | | JP | 02-277182 | 11/1990 |
| JP | 62-209686 | 9/1987 | | JP | 03-092983 | 4/1991 |
| JP | 62-235691 | 10/1987 | | JP | 03-092984 | 4/1991 |
| JP | 62-266686 | 11/1987 | | JP | 03-100785 | 4/1991 |
| JP | 63-000678 | 1/1988 | | JP | 403095693 A | 4/1991 |
| JP | 63-000679 | 1/1988 | | JP | 03-110689 | 5/1991 |
| JP | 63-065578 | 3/1988 | | JP | 03-113686 | 5/1991 |
| JP | 63-074026 | 4/1988 | | JP | 03-154182 | 7/1991 |
| JP | 63-124176 | 5/1988 | | JP | 03-176719 | 7/1991 |
| JP | 63-124177 | 5/1988 | | JP | 03-194675 | 8/1991 |
| JP | 63-156294 | 6/1988 | | JP | 03-194676 | 8/1991 |
| JP | 63-165982 | 7/1988 | | JP | 03-194677 | 8/1991 |
| JP | 63-177279 | 7/1988 | | JP | 03-217992 | 9/1991 |
| JP | 63-204374 | 8/1988 | | JP | 03-244092 | 10/1991 |
| JP | 63-205777 | 8/1988 | | JP | 03-246693 | 11/1991 |
| JP | 63-220216 | 9/1988 | | JP | 03-246778 | 11/1991 |
| JP | 63-221483 | 9/1988 | | JP | 403246693 A | 11/1991 |
| JP | 63-221484 | 9/1988 | | JP | 03-292578 | 12/1991 |
| JP | 63-221485 | 9/1988 | | JP | 403292578 A | 12/1991 |
| JP | 63-223875 | 9/1988 | | JP | 04-24881 | 1/1992 |
| JP | 63-228270 | 9/1988 | | JP | 04-088586 | 3/1992 |
| JP | 63-228271 | 9/1988 | | JP | 04-092990 | 3/1992 |
| JP | 63-269258 | 11/1988 | | JP | 04-120671 | 4/1992 |
| JP | 63-273975 | 11/1988 | | JP | 04-125780 | 4/1992 |
| JP | 63-273976 | 11/1988 | | JP | 04-182879 | 6/1992 |
| JP | 63-292275 | 11/1988 | | JP | 04-190470 | 7/1992 |
| JP | 63-298484 | 12/1988 | | JP | 04-230583 | 8/1992 |
| JP | 63-301368 | 12/1988 | | JP | 04-242486 | 8/1992 |
| JP | 63-301369 | 12/1988 | | JP | 04-252383 | 9/1992 |
| JP | 63-307586 | 12/1988 | | JP | 04-271477 | 9/1992 |
| JP | 63-310087 | 12/1988 | | JP | 04-271478 | 9/1992 |
| JP | 63-311484 | 12/1988 | | JP | 04-320899 | 11/1992 |
| JP | 01-013677 | 1/1989 | | JP | 04-367984 | 12/1992 |
| JP | 01-013678 | 1/1989 | | JP | 05-101168 | 4/1993 |

| | | | | | | |
|---|---|---|---|---|---|---|
| JP | 05-168610 | 7/1993 | | KR | 1020010000324 | 1/2001 |
| JP | 05-216891 | 8/1993 | | KR | 1020010000508 | 1/2001 |
| JP | 5-216981 | 8/1993 | | KR | 1020010002816 | 1/2001 |
| JP | 05-242230 | 9/1993 | | KR | 1020010035260 | 5/2001 |
| JP | 06-195450 | 7/1994 | | KR | 1020010035295 | 5/2001 |
| JP | 06-282636 | 10/1994 | | KR | 1020010057120 | 7/2001 |
| JP | 7-131322 | 5/1995 | | KR | 1020010074375 | 8/2001 |
| JP | 07-171137 | 7/1995 | | KR | 1020010080832 | 8/2001 |
| JP | 07-208001 | 8/1995 | | KR | 1020010083355 | 9/2001 |
| JP | 07-220041 | 8/1995 | | WO | WO 96/13800 | 5/1996 |
| JP | 07-262380 | 10/1995 | | WO | WO 97/14111 | 4/1997 |
| JP | 07-308308 | 11/1995 | | WO | WO 98/11478 | 3/1998 |
| JP | 07-319059 | 12/1995 | | WO | WO 98/11501 A3 | 3/1998 |
| JP | 07-331939 | 12/1995 | | WO | WO 98/11501 | 3/1998 |
| JP | 08-138046 | 5/1996 | | WO | WO 98/11501 A2 | 3/1998 |
| JP | 09-134419 | 5/1997 | | WO | WO 98/11750 | 3/1998 |
| JP | 10-14904 | 1/1998 | | WO | WO 98/35118 | 8/1998 |
| JP | 11-102432 | 4/1999 | | WO | WO 00/08591 | 2/2000 |
| JP | 11-203041 | 7/1999 | | WO | WO 00/28469 | 5/2000 |
| KR | 1993-242230 | 9/1993 | | WO | WO 00/38099 | 6/2000 |
| KR | 94-7344 | 4/1994 | | WO | WO 01/11549 | 2/2001 |
| KR | 9407344 | 8/1994 | | WO | WO 01/69520 | 9/2001 |
| KR | 1996-011690 | 4/1996 | | | | |
| KR | 1020000050137 | 8/2000 | | | | |
| KR | 102000063878 | 11/2000 | | | | |

\* cited by examiner

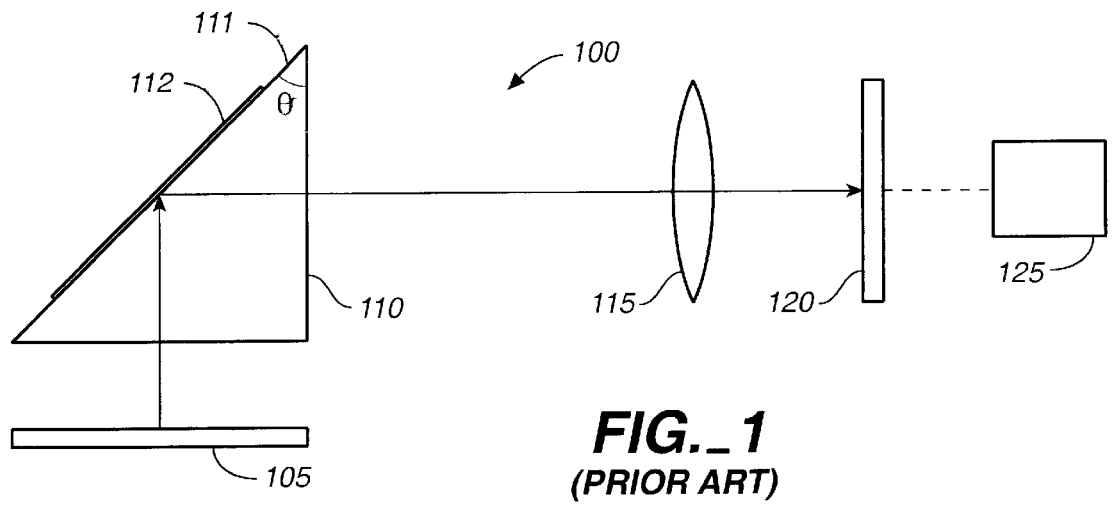
FIG._1
(PRIOR ART)
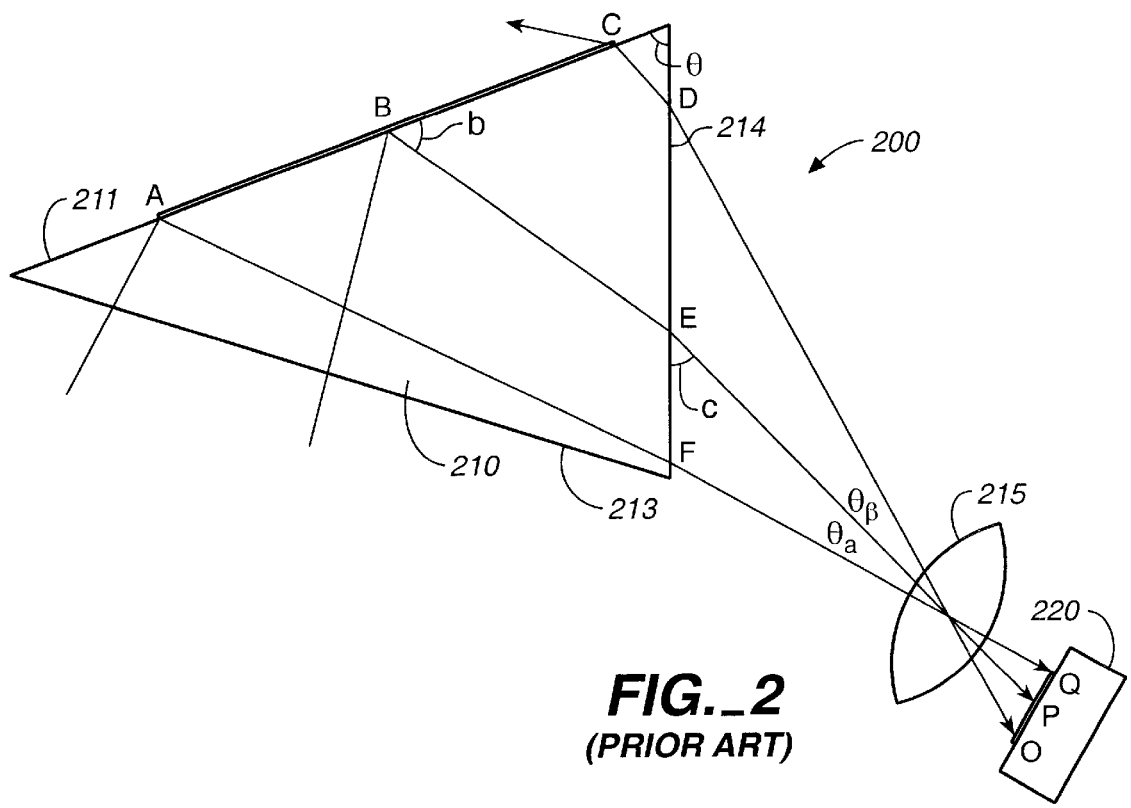
FIG._2
(PRIOR ART)

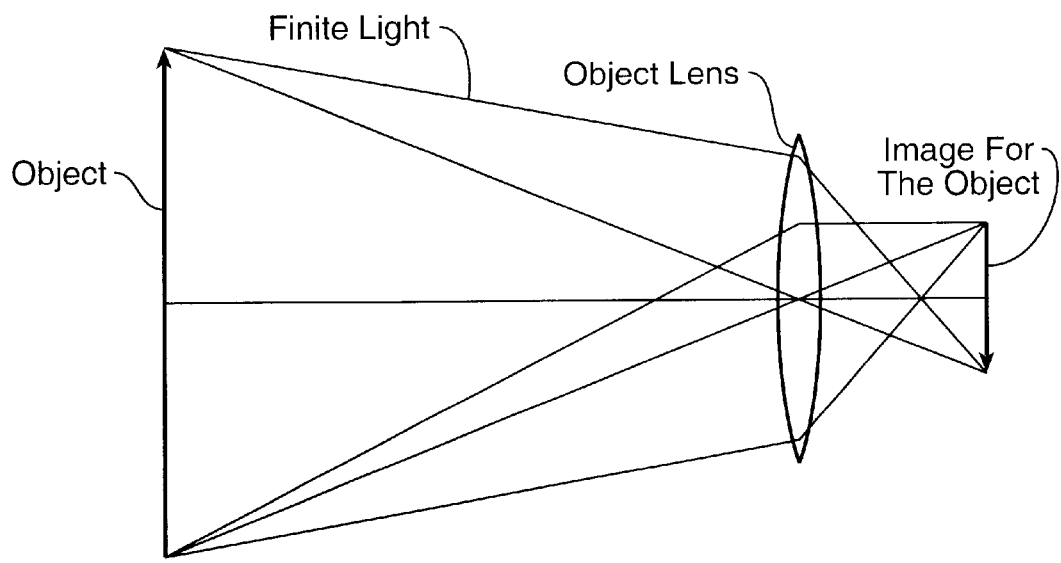
FIG._3
*(PRIOR ART)*
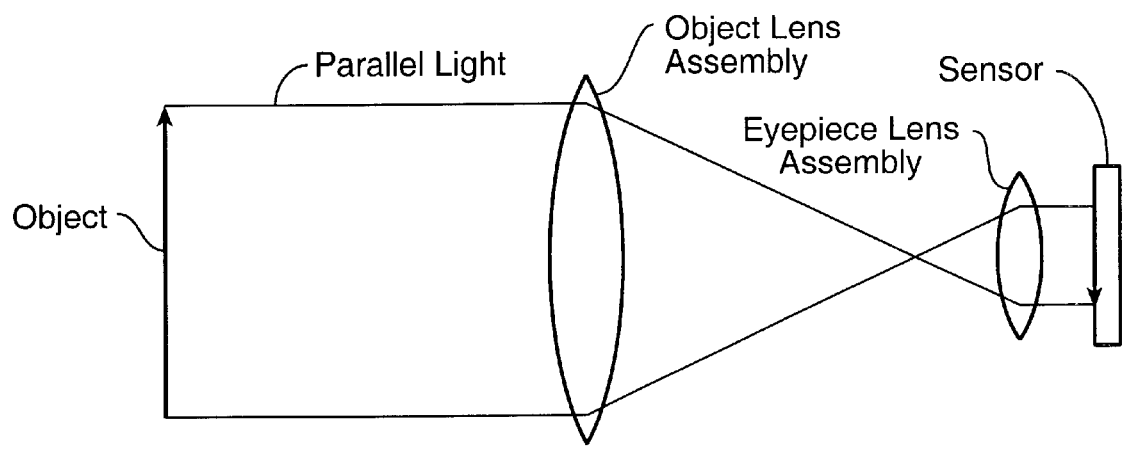
FIG._5

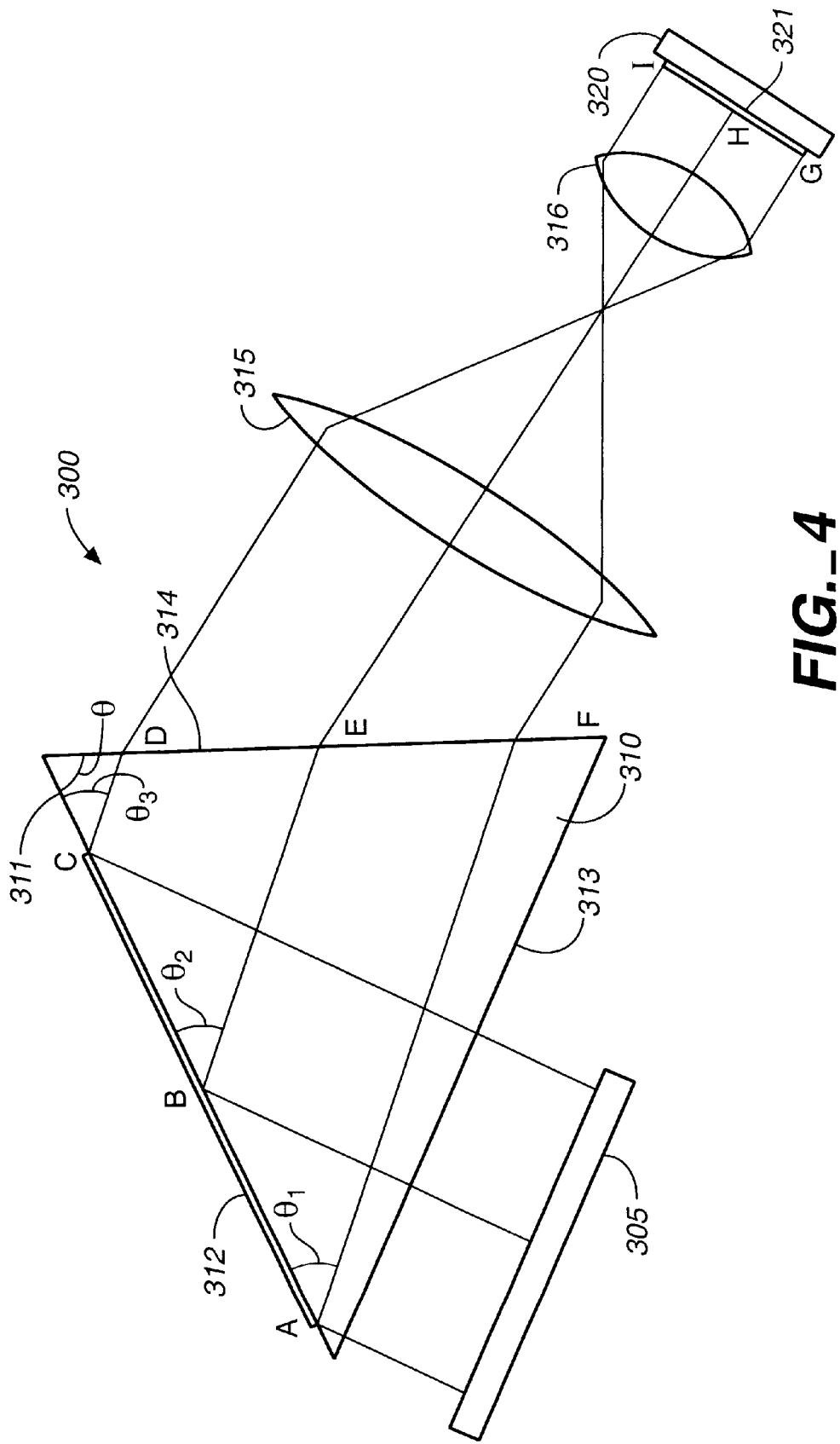
FIG._4

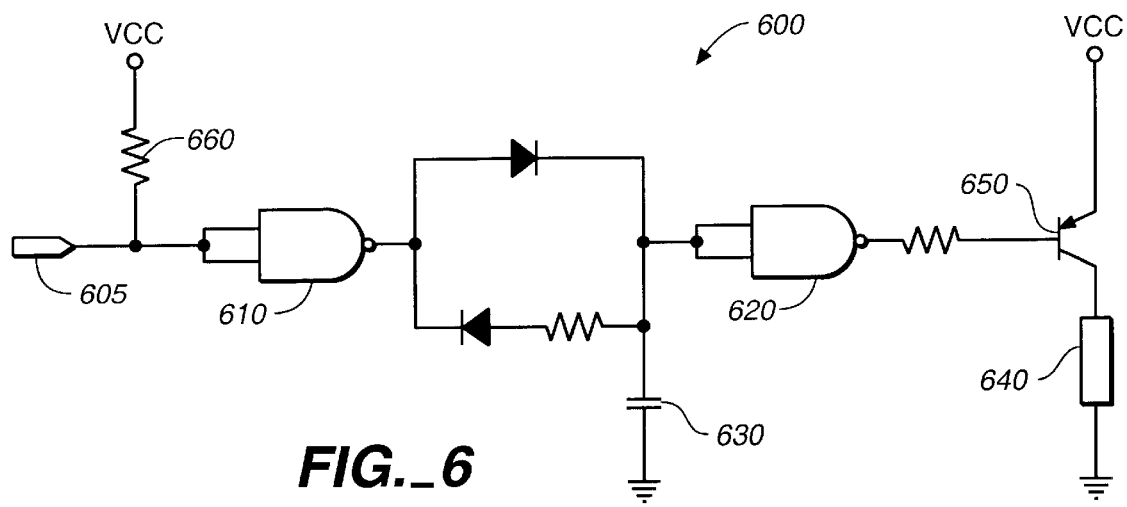
FIG._6
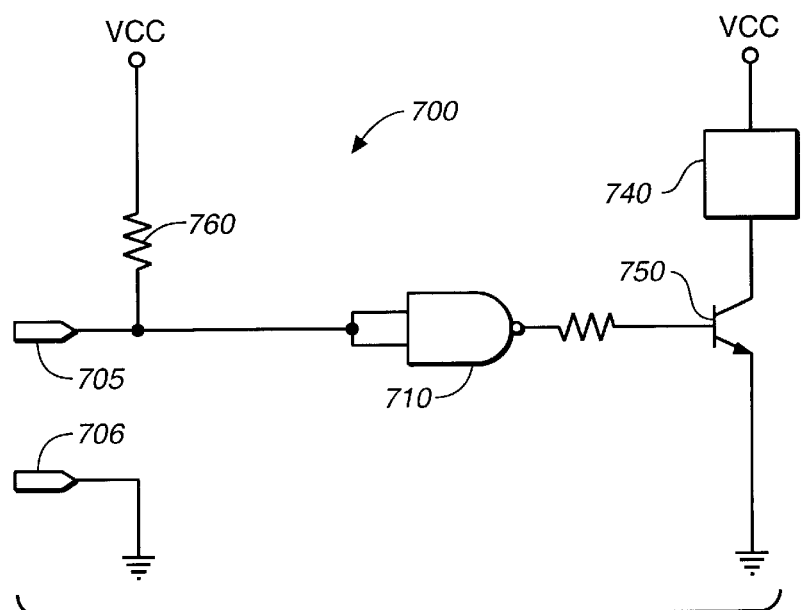
FIG._7

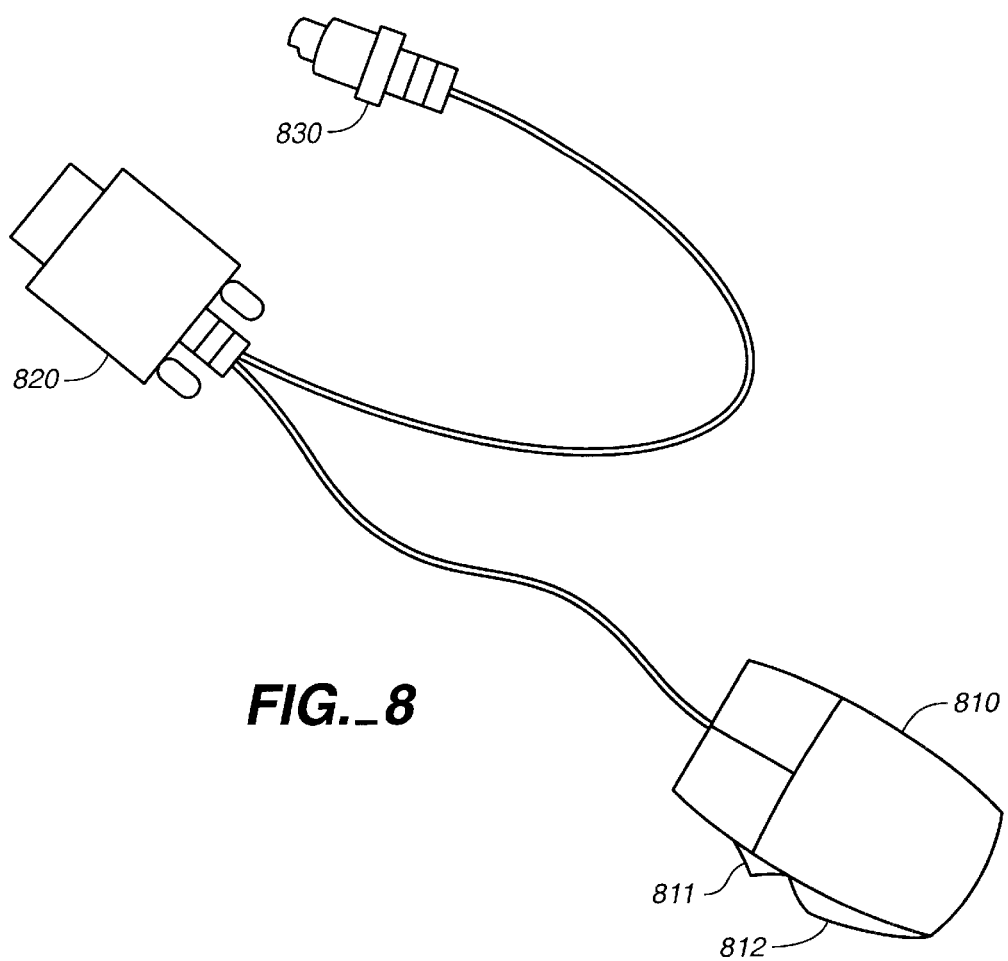
FIG._8
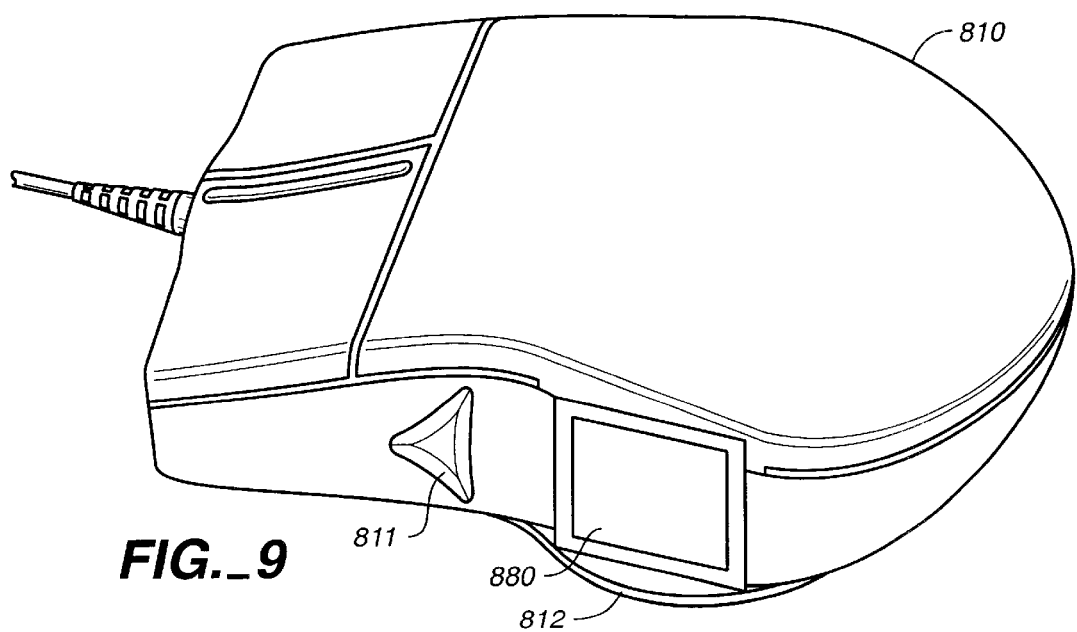
FIG._9

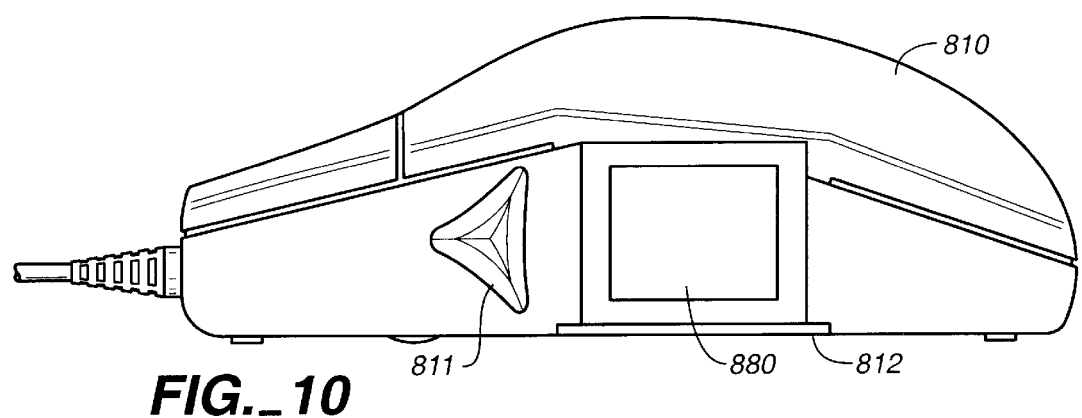
FIG._10
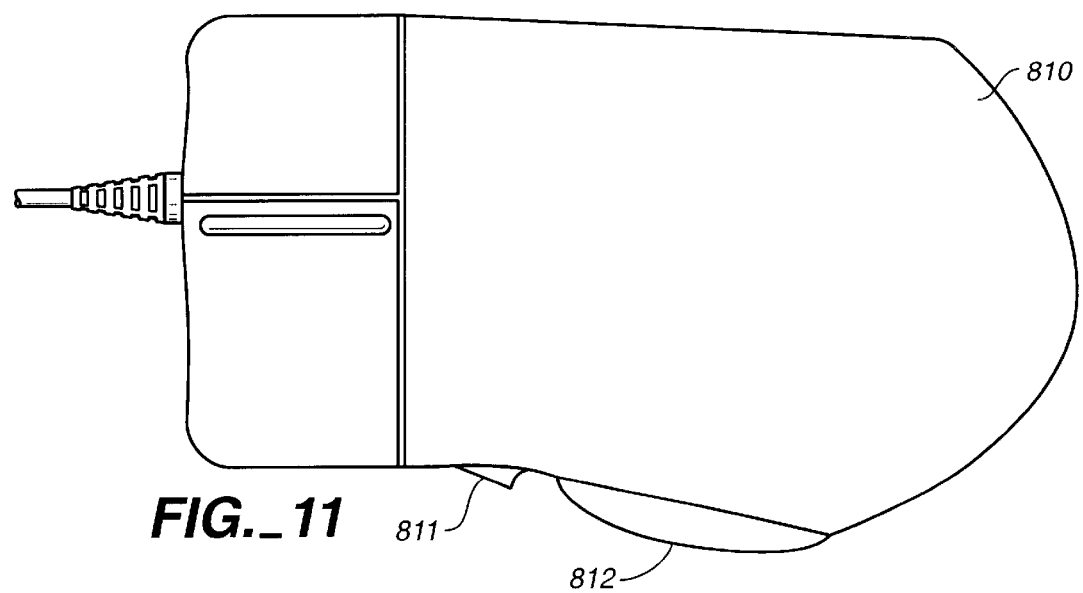
FIG._11

COMPACT OPTICAL FINGERPRINT CAPTURING AND RECOGNITION SYSTEM

This application claims benefit under 35 U.S.C. §119(e) of U.S. Provisional Application Ser. No. 60/095,525 filed Aug. 6, 1998.

BACKGROUND OF THE INVENTION

1. Field of the Invention

The present invention generally relates to fingerprint capturing and recognition systems. More specifically, the present invention relates to compact optical fingerprint capturing and recognition systems.

2. Description of the Related Art

FIG. 1 shows a schematic diagram of an earlier optical fingerprint capturing and recognition system. In FIG. 1, an optical recognition system 100 includes an illuminating light source 105, an optical prism 110, a lens assembly 115, an image sensor 120, and a storage and processing unit 125. The illuminating light source 105, which may, for example, be a light emitting diode (LED), generates a light ray that is transmitted to the optical prism 110. The optical prism 110 has an apex angle $\theta$ that is approximately 45 degrees. In an optical fingerprint capturing and recognition system, the apex angle is defined as the angle opposite to the incident surface of the optical prism, i.e., the surface of the prism that receives light from the light source. When there is no fingerprint or other object placed on the optical prism's fingerprinting surface 111, light entering the optical prism 110 from the illuminating light source 105 undergoes total internal reflection at the fingerprinting surface 111 if the incidence angle of the incoming light exceeds the critical angle of the optical prism 110. However, when there is a fingerprint or other object, such as object 112, touching the upper surface 111, then there is some scattering and/or absorption of the light incident on the point of contact between the object 112 and the fingerprinting surface 111. As a result of the scattering and/or absorption, there is less than total internal reflection of the incident light beam at points on the exterior surface that are in contact with object 112. Consequently, the reflected light beam at such contact points are weaker. Weaker light beams eventually translate into darker points to indicate the presence of an object at the point of incidence between the light beam and the fingerprinting surface 111. Conversely, stronger reflected light beams, such as those that undergo total internal reflection, translate into brighter points to indicate the absence of an object at the point of incidence between the light beam and the fingerprinting surface 112. This allows distinguishing the darker fingerprint ridge points from the lighter fingerprint valley points. Light beams reflected from the fingerprinting surface 111, both totally internally reflected light beams and partially internally reflected light beams, are transmitted in the direction of the lens assembly 115, which may contain one or more optical lenses. Thereafter, light beams from the lens assembly 115 are captured by the image sensor 120. Image sensor 120, which may, for example, be a charge coupled device (CCD), captures optical light images and converts them to electrical signals. The electrical signals are then transmitted to the storage and processing unit 125. Storing and processing unit 125 may include a memory unit, a processor and an analog to digital converter. The analog to digital converter converts the analog electrical signals from the image sensor 120 into digital data. The memory is used to store the digital data and algorithms for comparing a captured fingerprint image with a stored fingerprint image. The processor compares the captured digital data with data previously stored in memory based on an algorithm for comparing such data. The processor may also analyze the captured digital data for purposes different from comparison with stored data.

The above described system allows capturing an optical fingerprint image and processing the electrical representation of the optical fingerprint image. However, the above system suffers from some severe disadvantages. First, the optical recognition system 100 tends to be relatively large due to the relatively large distance between the optical prism 110 and the lens assembly 115. The large distance between the optical prism 110 and the lens assembly 115 is dictated by the following problems associated with attempting to capture optical images of an object that is larger than the first lens (i.e., the first lens that receives light rays from the optical prism) in the lens assembly in a system whose optical prism is relatively close to the lens assembly. In systems whose optical prism is relatively close to the lens assembly, when the object is larger than the first lens in the lens assembly, points near the ends of the object are not captured by the system. Moreover, the optical path of the light rays incident on the first lens in the lens assembly are not parallel to the optical axis of the first lens. Light paths that are not parallel to the optical axis are not well defined and generate greater uncertainty in determining the optical paths in the system. Thus, the large distance between the optical prism 110 and the lens assembly 115 is required in the above mentioned system in order to (1) help capture optical images near the ends of an object that is larger than first lens in lens assembly 115 and (2) make the optical paths of light rays from the optical prism 110 to the lens assembly 115 approximately parallel to the optical axis of the first lens in the lens assembly 115. Second, such systems can suffer from significant image distortions.

To overcome the disadvantage of large distortions in the captured images with respect to the object images, some fingerprint capturing and recognition systems, such as that disclosed in Korean Patent Number 94-7344, use an optical prism with an apex angle $\theta$ greater than 45 degrees. FIG. 2 shows the optical assembly 200 using an optical prism having an apex angle greater than 45 degrees. In the system used by Korean Patent Number 94-7344, which is herein incorporated by reference, the apex angle $\theta$ is determined by the following equation:

$$\sin(\theta)/n \approx \sin(b)\sin(c) \qquad \text{equation (1)}$$

where $\theta$ is the apex angle;

n is the refractive index of the optical prism 210;

b is the angle between the fingerprinting surface 211 (also known as the imaging surface) and the light reflected from it;

c is the angle between the light escaping the optical prism 210, at the image collecting surface 214, and the image collecting surface 214 (also known as the prism surface).

Optical assembly 200 comprises an optical prism 210, a lens assembly 215 and an image sensor 220. The optical assembly 200 also suffers from some disadvantages of earlier optical structures.

First, there is the problem of image distortion because non-parallel light rays are transmitted from the object to the lens assembly 215. As a result, even when angle $\theta_a$ is equal to angle $\theta_\beta$, the ratio of length AB to EF is not equal to the ratio of length BC to DE. This is an indication of the presence of distortion in the optical assembly due to the optical prism 210. More generally, the ratio of lengths of AB to PQ is not equal to the ratio of lengths of BC to PO, indicating the presence of distortion in the optical assembly 200. Second, there is some image loss in the system when lens assembly 215 is not placed sufficiently far away from the optical prism 210 so as to make the optical paths essentially parallel to the optical axis of the first lens in lens assembly 215.

In the system of FIG. 2, since the lens is smaller than the projection of the object through the optical prism, not only parallel light reflected from the object, such as a fingerprint, is employed to produce an image of the object. Therefore, some non parallel light reflected from the object is used in such a system. As a result of using non-parallel light reflected from the object, the lens is typically located at a relatively long distance from the object in order to approximate the condition of total internal reflection. Otherwise, if the lens is close enough to the optical prism such that a condition approximating total internal reflection is not met, then some of the light rays from the object will be lost and will not be captured by the sensor.

As the optical assembly 200 also may suffer from the problem of image loss when the optical prism is relatively close to the lens assembly, the lens assembly is placed such that the optical prism is relatively far from the lens assembly in order to capture the entire fingerprint. This causes the fingerprint capturing and recognition systems using the optical assembly of FIG. 2 to be relatively large due to the required relatively large distance between the optical prism and the lens assembly.

As the lens system in FIG. 2 has a finite entrance pupil, the problems associated with the optical assembly 200 may succinctly be explained as those associated with lens systems using a finite entrance pupil. In an optical fingerprint capturing and recognition system, a first lens diameter that is not larger than the projection of the fingerprint through the optical prism is characteristic of a lens assembly having a finite entrance pupil. The first lens diameter is the diameter of the first lens in the lens assembly, i.e., the first lens in the lens assembly that receives an optical image of the object through the optical prism. FIG. 3 shows a conventional lens system with a finite entrance lens. As shown in FIG. 3, the optical paths are finite light paths that are not parallel to the optical axis of the object lens.

Other earlier systems have used holographic techniques to deal with the problems of distorted images. Holographic systems typically use a polarizer and a scanning line guide to reduce distortion in images and to provide optical parallelism between the plane of the fingerprint image and the image capturing surface. However, these systems ordinarily require expensive and complex optical components. Moreover, holograms generally require nearly perfect data about the object whose image needs to be captured. As a result, such a system requires complementary optical systems to make up for the likely shortages in fingerprint data. The complexity of the system in addition to the need for complementary optical systems makes the fingerprint capturing and recognition system using holographic techniques large and complex, both in terms of hardware and software.

Thus, there has been a need for an optical fingerprint capturing and recognition system that uses an optical structure with which the entire image of an object may be captured without distortion when the distance between the lens assembly and the optical prism is too small to approximate the condition of total internal reflection. In other words, there has been a need for a compact optical structure that can capture the entire image of an object, such as a fingerprint, without distortion.

SUMMARY OF THE INVENTION

The present invention overcomes the aforementioned disadvantages by using an optical fingerprint recognition system comprising an optical prism with an apex angle larger than 45 degrees and a lens assembly with a relatively large first lens. An apparatus for forming an image of a patterned object according to the present invention includes a light refractor such as a prism, at least one focusing lens, and at least one light source. The light refractor has an imaging surface against which a patterned object is to be placed, at least one light entrance surface adjacent to the imaging surface through which light enters the refractor, and a viewing surface through which an image of the object to be imaged is projected. The focusing lens is adjacent to the viewing surface and receives and focuses an image of the patterned object projected through the viewing surface. The focusing lens has a diameter that is larger than a projection of the patterned object through the light refractor. The light source is located adjacent to the light receiving surface and emits incident light which enters the light refractor to create an image of the patterned object. The light source defines a light source plane. The light source is positioned such that substantially all light emitted from the light source in a direction substantially parallel to the light source plane directly strikes the imaging surface of the light refractor. The apparatus can also include a biometric circuit having at least one contact located adjacent to the imaging surface. The biometric circuit is for detecting the presence of a finger touching the contact.

Because the focusing lens is larger than a projection of the object through the light refractor, the focusing lens can be placed relatively close to the viewing surface without losing a portion of the image near the edges of the image. This advantageously allows the image forming apparatus to be relatively compact because the focusing lens does not have to be placed a relatively large distance from the viewing surface. Additionally, by configuring the light source such that substantially all the light emitted in a direction perpendicular to a light source plane directly strikes the imaging surface (that is, the light does not first strike another surface), the amount of stray, reflected light in the light refractor is reduced. This advantageously reduces background or "noise" light in the light refractor that might cause degradation of an image by reducing the contrast of the image. Further, by including a biometric circuit which detects the presence of a live finger at the imaging surface, the likelihood that the imaging apparatus will be fooled by a replica of a fingerprint is advantageously reduced.

In another aspect of the present invention, a fingerprint imaging apparatus includes an imaging surface against which a fingerprint to be imaged is to be placed. The imaging apparatus also includes a biometric circuit for detecting the presence of the fingerprint to be imaged by the imaging apparatus. The biometric circuit has at least one electrical contact adjacent to the imaging surface and against which a finger, which acts as an ac signal source, can be placed. The biometric circuit also includes a charging circuit connected with the electrical contact. The charging circuit charges in response to the ac signal sourced from the finger placed against the electrical contact. A switching circuit which is electrically connected with the charging circuit is responsive to the charging circuit to indicate the presence of a finger at the imaging surface.

In another embodiment, the biometric circuit of the fingerprint imaging apparatus includes at least two electrical contacts adjacent to the imaging surface and against which a finger, which acts as an electrical resistance, can be placed to create an electrical connection between the contacts. A voltage supply is electrically connected to at least one of the contacts. A switching circuit is electrically connected to at least one of the electrical contacts and the voltage supply. The switching circuit is responsive to a reduction in voltage from the voltage supply caused by an electrical resistance placed between the contacts to detect the presence of a finger on the contacts.

Each of the above two described embodiments of a fingerprint imaging apparatus having a biometric circuit are advantageously relatively simple, can be made relatively compact, require relatively little circuitry, and do not require an ac signal source internal to the biometric circuit.

The present invention also encompasses a pointing device, such as a cursor pointing device including a computer mouse, a track ball, a touch pad or a joy stick, comprising the optical structure of the fingerprint capturing and recognition system of the present invention. In a presently preferred embodiment, the pointing device of the invention includes both a horizontal guide and a vertical guide for aligning a finger whose fingerprint image is to be taken to be properly aligned with the optical prism of the optical structure. Additionally, the pointing device includes a serial port connector for transmitting data representing a capture image of a fingerprint from an optical structure to a computer to which the pointing device is coupled and a conventional pointing device port connector for transferring power and other signals between a pointing device and a computer.

BRIEF DESCRIPTION OF THE DRAWINGS

FIG. 1 is a schematic diagram of one prior art optical capturing and recognition system.

FIG. 2 is a schematic diagram of an optical assembly of another prior art optical capturing and recognition system.

FIG. 3 is a schematic diagram of a lens system with a finite entrance pupil such as that of the optical assembly of FIG. 2.

FIG. 4 is a schematic diagram of the optical structure of the optical fingerprint capturing and recognition system of the present invention.

FIG. 5 is a schematic diagram of a lens system with an infinite entrance pupil of the present invention such as that of the optical structure of FIG. 4.

FIG. 6 is a circuit diagram of one embodiment of the biometric sensing circuit of the present invention.

FIG. 7 is a circuit diagram of another embodiment of the biometric sensing circuit of the present invention.

FIG. 8 is a top view of a computer mouse of the present invention with a serial port connector and a conventional computer mouse connector.

FIG. 9 is a side perspective view of the computer mouse of the present invention.

FIG. 10 is a side view of the computer mouse of the present invention.

FIG. 11 is a top view of the computer mouse of the present invention.

DETAILED DESCRIPTION OF THE PREFERRED EMBODIMENT

FIG. 4 is a schematic diagram of the optical structure of the optical fingerprint capturing and recognition system of the present embodiment of the invention. The optical structure 300 comprises an illuminating light source 305, an optical prism 310, an object lens assembly 315, an eyepiece lens assembly 316, and an image sensor 320.

Illuminating light source 305 is a plane light source, such as an LED array. As incident surface 313 of optical prism 310 is translucent, it uniformly disperses the incoming light received from illuminating light source 305 such that optical prism 310 receives light of uniform intensity from incident surface 313. The incident surface 313 may be made translucent by sand papering or other means known to those skilled in the art. In one alternative embodiment, a translucent layer may be placed between the illuminating light source 305 and the optical prism 310. In yet another embodiment, illuminating light source 305 may be a uniform light source.

Optical prism 310 has an apex angle θ that is determined by using equation (1) disclosed in the Background of the Invention, is greater than 45 degrees and is preferably between 52 and 72 degrees. Fingerprinting surface 311 is laminated or coated with polyethylene, polypropylene or polyethylene terephthalate (PET) treated with a surfactant to improve scattering of light impinging on the fingerprint surface 311 and to provide better contact between the imaged object 312 (i.e., a finger, and more specifically the ridges on the fingerprint) and the fingerprinting surface 311. The treatment with surfactant provides the improved contact between the finger 312 and the fingerprinting surface 311. The incoming light in the optical prism 310 undergoes reflection/absorption at the internal side of fingerprint surface 312. Some light is absorbed or scattered at points of contact between the fingerprint ridges and the fingerprint surface 312. As a result, dark line images are captured representing the fingerprint ridges in a bright background representing the fingerprint valleys or other points where there is no contact between the finger and the fingerprinting surface 311. Points where there is no contact between the finger and the fingerprinting surface 311 are represented by bright images because light at those points is totally internally reflected. Alternatively, a polyurethane or other flexible material layer may be used on the fingerprinting surface to improve scattering as is known in the art. Similarly, as is known in the art, a viscous oily liquid may be used on the fingerprinting surface to improve contact between the fingerprint and the fingerprinting surface.

Object lens assembly 315 may include one or more lenses. The first lens in object lens assembly 315, i.e., the first lens which receives light rays from the optical prism 310, has a diameter that is larger than the projection of the fingerprint through the optical prism 310 or is larger than the diagonal line segment connecting diagonally opposed corners of the smallest rectangle that completely encompasses the fingerprint whose image is to be captured. A first lens diameter that is larger than the projection of the fingerprint through the optical prism is characteristic of a lens assembly having an infinite entrance pupil. The first lens diameter is the diameter of the first lens in the lens assembly, i.e., the first lens in the lens assembly that receives an optical image of the object through the optical prism. A first lens with a large diameter as defined above allows placing the lens in close physical proximity to the optical prism 310 without losing light rays representative of the image of the fingerprint. The close proximity between the optical prism 310 and the first lens of the object lens assembly 315 reduces the overall size of the optical structure of the optical fingerprint capturing system. Thus, using a large lens, as defined above, allows reducing the size of the optical system. Similarly, using lenses having relatively small focal lengths allows placing the image sensor 320 closer to the object lens assembly 315 while capturing the entire image of the fingerprint. As explained further below, the reduced size of the optical structure enables one to place the optical structure in a small device, such as a computer mouse or keyboard, a door or other type of locking system. The optical structure can also be placed in an automatic teller machine (ATM). Additionally the first lens is tilted away from the apex angle in order to reduce or eliminate the optical path difference between light rays reflected from different points of the target area that whose fingerprints are to be captured by the optical fingerprinting system so as to eliminate distortion. Light rays from the first lens are then passed to other lenses within the object lens assembly 315 and are eventually transmitted to the eyepiece lens assembly 316, which may include one or more lenses. Eyepiece lens assembly 316 focuses light rays received from the object lens assembly 315 onto the surface of the image sensor 320.

In a presently preferred embodiment, image sensor 320 is a complementary metal-oxide-semiconductor (CMOS) sensor. Image sensor 320 receives light rays from lens assembly 315 and converts the captured light rays into electrical signals. In a presently preferred embodiment, the image sensor converts the light rays into 4 bit digital data. In other embodiments, the light rays may be converted to 8 bit digital data or some other number of bits. Image sensor 320 may be a CMOS sensor available from OMNI Vision a United States based company, VLSI Vision a United Kingdom based company, Hyundai Electronics a South Korea based company. In another embodiment, image sensor 320 may comprise a CCD which converts the light rays into analog rather than digital signals. The analog signals are then converted to digital signals by an analog to digital converter. The digital data is then transferred to a computer for storage and/or processing.

In one embodiment, which is further described below in relation to a computer mouse having a fingerprint image capturing optical structure, the digital data is transferred to a bus controller which then transfers the data on a RS 232 serial bus to the computer. In another embodiment, a universal serial bus (USB) or some other computer interface bus may be used to transfer digital data from the bus controller to the computer. In a preferred embodiment, the image sensor 320, such as a CMOS sensor, and the bus controller (not shown) are on the same integrated circuit (IC) chip.

FIG. 5 is a schematic diagram of a lens system with an infinite entrance pupil in accordance with a present embodiment of the invention such as that of the optical structure of FIG. 4. In FIG. 5, the object lens is larger than the object and parallel light paths from the object are transmitted to the object lens. A lens system with an infinite entrance pupil, such as that shown in FIG. 5, allows placing the lens assembly 315 close to the optical prism 310 without losing any part of the image or causing any distortion.

In FIG. 4, the lens system of optical structure 300 includes the object lens assembly 315 and the eyepiece lens assembly 316 and has an infinite entrance pupil. As the lens system of optical structure 300 has an infinite entrance pupil, the ratio of lengths AB to IH is equal to the ratio of the lengths of BC to HG. It then follows that when length AB is equal to length BC, then length IH will be equal to length HG. Furthermore, $\theta_1$, $\theta_2$, and $\theta_3$, which are shown in FIG. 4, are all equal to one another. In other words, $\theta_1=\theta_2=\theta_3$. As the ratio of lengths AB to IH is equal to the ratio of the lengths of BC to HG and $\theta_1=\theta_2=\theta_3$, the optical structure 300 of FIG. 4, captures complete and distortion-free fingerprint images.

FIG. 6 is a circuit diagram of one embodiment of the biometric sensing circuit of a present embodiment of the invention. In biometric sensing circuit 600, a person touching the electrode 605 acts as an AC signal source. In the positive half of the first AC cycle while a person contacts the electrode 605, the output of inverter 610 is low and the output of inverter 620 is high. As the output of inverter 620 is high, transistor 650 will not turn on. It is also considered to use any other suitable active electronic component such as a field effect transistor or an operational amplifier in place of transistor 650. In the negative half of the first AC cycle while a person contacts the electrode 605, the output of inverter 610 is high and the output of inverter 620 is low. As the output of inverter 620 is low, transistor 650 will turn on and source current to the optical structure 640, therefore, turning on the optical structure 640. After a transient period which may be set to shorter than the period for the AC signal induced from the person touching the electrode 605, the capacitor 630 is charged such that the voltage at the input of inverter 620 remains high both during the positive and negative halves of the AC cycle for as long as the person continues to maintain contact with the electrode 605. As a result the output of inverter 620 continues to remain low and transistor 650 continues to remain on and source current to the optical structure 640. When the person stops holding the electrode 605, capacitor 630 discharges such that the voltage at the input of inverter 620 turns low. As a result the output of the inverter 620 becomes high and the transistor 650 is turned off and stops sourcing current to the optical structure 640 thus causing optical structure 640 to turn off.

FIG. 7 is a circuit diagram of an alternative biometric sensing circuit of a present embodiment of the invention. In biometric sensing circuit 700, a person touching electrodes acts as a resistance. Resistor 760 has a sufficiently large resistance such that the voltage at the input of inverter 710 is low even when a person touches electrodes 705 and 706. In one embodiment, resistor 760 has a resistance of greater than 10 megaohms and preferably has a resistance greater than 15 megaohms. This is also the case with respect to resistor 660 shown in FIG. 7. When a person touches resistors 705 and 706, the voltage at input of inverter 710 will be low and the output of inverter 710 will be high. As the output of the inverter 710 is high the transistor 750 will be turned on and will source current to the optical structure 740, therefore, turning on the optical structure 740. It is also considered to use any other suitable active electronic element in place of transistor 750, such as a field effect transistor or an operational amplifier. When a person discontinues contacting electrodes 705 and 706, the input of inverter 710 will be high and the output of inverter 710 will be low. When the output of inverter 710 is low, transistor 750 will turn off and discontinue sourcing current to optical structure 740, therefore, causing optical structure 740 to turn off.

The biometric sensors 600 and 700 may be used to prevent the image of a fingerprint instead of an actual fingerprint for accessing a system that uses the fingerprint as a security access key.

FIG. 8 is a top view of a computer mouse 810 of a present embodiment of the invention with a serial port connector 820 and a conventional computer mouse connector 830. In a presently preferred embodiment, computer mouse 810 includes both a horizontal guide 811 and a vertical guide 812 for ensuring that a finger whose fingerprint image is to be taken is properly aligned in the horizontal and vertical directions, respectively, with respect to the fingerprinting surface of the optical prism of the optical structure. In some embodiments of the computer mouse use of only one of the horizontal and vertical guides may be sufficient for aligning the finger with the optical prism. Furthermore, computer mouse 810 includes an optical structure of the present invention such as optical structure 300 used in the optical fingerprint capturing and recognition system of the present invention. The ability to house the optical structure 300 inside computer mouse 810 is due to the relatively small size of optical structure 300. The relatively small size of optical structure 300 is accomplished by use of a lens system with an infinite entrance pupil which allows placing the lens assembly within close proximity of the optical prism while capturing the image of the entire object and being distortion free.

The mouse 810 is coupled to a serial or parallel connector 820 and a conventional computer mouse connector 830. The serial connector 820 transmits fingerprint capture data from the optical structure to a computer to which the pointing device is coupled. The serial connector 820 is in one embodiment an RS 232 port connector. Since RS 232 lines are relatively slow, they preferably transmit 4 bit data signals, representing 4 bit gray levels, from the computer mouse 810 to the computer (not shown) to which the computer mouse 810 is coupled. It is to be noted that the 4 bit data signals transmitted from the mouse 810 to the RS 232 port connector by way of the RS 232 lines are video data as they represent fingerprint images. Thus, the present invention uses RS 232 lines and RS 232 port connectors to transfer video data. Alternatively, serial connector 820 may be a USB connector. Since USB is a fast bus, it will preferably transmit 8 bit data representing 8 bit gray levels. The conventional mouse port connector transfers power and other signals related to conventional mouse operation, between the computer mouse 810 and a computer (not shown) to which the computer mouse 810 is coupled. The conventional mouse port connector may be a PS/2 port connector.

FIG. 9 is a side perspective view of the computer mouse of a present embodiment of the invention. In FIG. 9, vertical guide 812 is shown as being near the bottom of the computer mouse 810 (or the fingerprinting surface 880). In an alternative embodiment, vertical guide 812 may be located near the top of computer mouse 810 (or the fingerprinting surface 880) rather than the bottom as shown in FIG. 9. FIG. 9 also shows the fingerprinting surface 880 of the optical prism of the optical structure of the present invention. The optical structure of the present invention captures the optical image of a fingerprint placed against the fingerprint surface 880. The optical image of the fingerprint may be used as a security access key or password for accessing a computer system, either upon booting the computer or when reentering a computer system from a screen saver.

FIG. 10 is a side view of the computer mouse of the present invention.

FIG. 11 is a top view of the computer mouse of the present invention.

Although the above description has been made in relation to a computer mouse, it is to be noted that the optical structure of the present invention may be used in conjunction with other pointing device, including other cursor pointing devices. For example, the optical structure of the present invention may be used in conjunction with a track ball, a touch pad or a joy stick. More specifically, the optical structure of the present invention may be included inside a track ball, a touch pad, or a joy stick, among other cursor pointing devices. In fact, the optical structure may be incorporated into devices other than pointing devices. For example, the optical structure may be incorporated into telephones, televisions, cars, doors, as well as other items. The fingerprint image may be used as a security access key by the aforementioned items.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements.

What is claimed is:

1. A compact apparatus for forming a high contrast, low distortion image of a patterned object including:
   a light refractor for reflecting and refracting light, the light refractor including;
   an imaging surface against which a patterned object to be imaged is to be placed;
   at least one light entrance surface adjacent to the imaging surface and through which light enters the light refractor; and
   a viewing surface adjacent to the imaging surface and through which an image of the object to be imaged is projected wherein the viewing surface and the imaging surface intersect to form an angle of between 52 and 72 degrees;
   at least one focusing lens adjacent to the viewing surface and for receiving and focusing an image of the patterned object projected through the viewing surface, the focusing lens having a diameter that is larger than a projection of the patterned object through the light refractor; and
   at least one light source located adjacent to the light receiving surface and for emitting incident light which enters the light refractor to create an image of the patterned object at the viewing surface, the light source defining a light source plane and positioned such that substantially all light emitted from the light source in a direction substantially perpendicular to the light source plane directly strikes the imaging surface of the light refractor.

2. The apparatus of claim 1 including a coating placed on the imaging surface, the coating selected from the group consisting of polyethylene, polypropylene and polyethylene terephthalate.

3. The apparatus of claim 2 wherein the light refractor is a five faced triangular prism and the imaging surface includes a first rectangular face of the triangular prism different from both the viewing surface and the light entrance surface.

4. The apparatus of claim 3 wherein the light entrance surface uniformly spreads the incoming light into the light refractor.

5. The apparatus of claim 1 including a biometric circuit having at least one contact located adjacent to the imaging surface, the biometric circuit for detecting the presence of a finger touching the at least one contact.

6. A method of imaging a patterned object comprising:
   providing a light refractor having an imaging surface, a light receiving surface and a viewing surface;
   forming an angle between the imaging surface and viewing surface of between 52 and 72 degrees;

placing the patterned object against the imaging surface of the light refractor;

projecting incident light from a light source through the light receiving surface of the light refractor;

directly striking the imaging surface with substantially all of the light emitted perpendicularly from the light source to create an image of the patterned object; and providing a focusing lens adjacent to the viewing surface and which has a diameter that is larger than a projection of the patterned object through the light refractor;

projecting the image of the patterned objection through the focusing lens.

7. The method of claim 6 including the step of the covering the imaging surface with a coating selected from the group consisting of polyethylene, polypropylene and polyethylene terephthalate.

8. The method of claim 7 including the step of detecting the presence of a finger at the imaging surface using a biometric circuit having at least one contact located adjacent to the imaging surface.

9. A compact apparatus for forming a high contrast, low distortion image of a patterned object including:

a light refractor for reflecting and refracting light, the light refractor including;

an imaging surface against which a patterned object to be imaged is to be placed;

at least one light entrance surface adjacent to the imaging surface and through which light enters the light refractor; and a viewing surface adjacent to the imaging surface and through which an image of the object to be imaged is projected wherein the viewing surface and the imaging surface intersect to form an angle of between 52 and 72 degrees;

at least one focusing lens adjacent to the viewing surface and for receiving and focusing an image of the patterned object projected through the viewing surface, the focusing lens having a diameter that is larger than a projection of the patterned object through the light refractor; and at least one light source located adjacent to the light receiving surface and for emitting incident light which enters the light refractor to create an image of the patterned object at the viewing surface.

* * * * *